Aug. 17, 1965   W. P. MANSFIELD   3,200,798
INTERNAL COMBUSTION ENGINES AND PISTONS THEREFOR
Filed Jan. 12, 1965   4 Sheets-Sheet 1

United States Patent Office 3,200,798
Patented Aug. 17, 1965

3,200,798
INTERNAL COMBUSTION ENGINES AND PISTONS THEREFOR
Wilfred Percival Mansfield, Slough, England, assignor to The British Internal Combustion Engine Research Institute Limited, Slough, England
Filed Jan. 12, 1965, Ser. No. 424,965
Claims priority, application Great Britain, Jan. 15, 1964, 1,746/64
5 Claims. (Cl. 123—48)

The invention relates to internal combustion engines and pistons therefor, and in particular to a method and means for varying the clearance volume in a cylinder of a two stroke cycle internal combustion engine with the object of increasing the efficiency of said engine.

In the specification of my Patent 3,014,468 there is described and claimed a two stroke cycle internal combustion engine having a piston in which at least part of the crown is capable of limited relative axial movement in relation to the connection between the piston and the means for converting reciprocating movement of the piston into rotary motion of the engine output shaft, characterised in that the movement in the direction to decrease the clearance volume is caused by the storage of energy produced by the pressure of a fluid when the piston is around top dead centre and the use of said stored energy during the lower part of the piston stroke to effect said movement.

It is a further feature of the invention described and claimed therein that the pressure produced by the deceleration of the column of oil in the connecting rod around top dead centre together with the normal lubricating oil supply pressure may be used to charge a small oil accumulator comprising a cylinder and spring loaded plunger. Later in the cycle, while the engine piston is moving in the outer part of its stroke and the pressure in the hydraulic chamber formed between the main inner and outer portions of the piston is at a low value, the spring forces the oil out of the accumulator into the hydraulic chamber, thereby effecting in each cycle a small movement of the outer portion relative to the inner portion thus increasing the distance between the piston crown and the inner portion.

In accordance with the present invention, however, the movement in the direction to decrease the clearance volume is caused by the pressure of a fluid supplied by a mechanically operated pump.

The accompanying drawings show, by way of example only, two embodiments of the invention in which:—

FIGURES 5 and 6 are sections of alternative piston and pump arrangements respectively, while.

Figure 2:
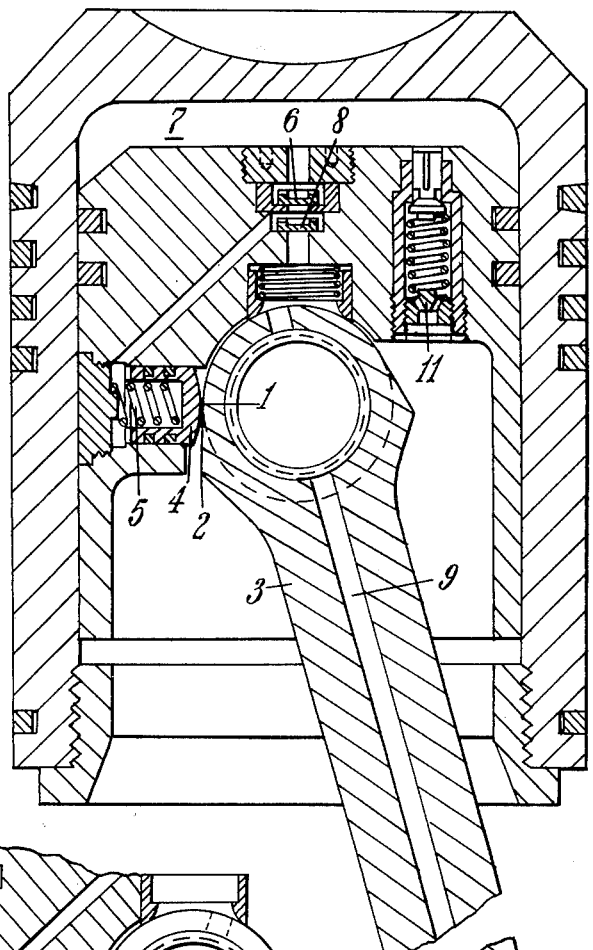
FIGURE 2 is a section of part of the construction of FIGURE 1 with the connecting rod in a different position.
Figure 1:
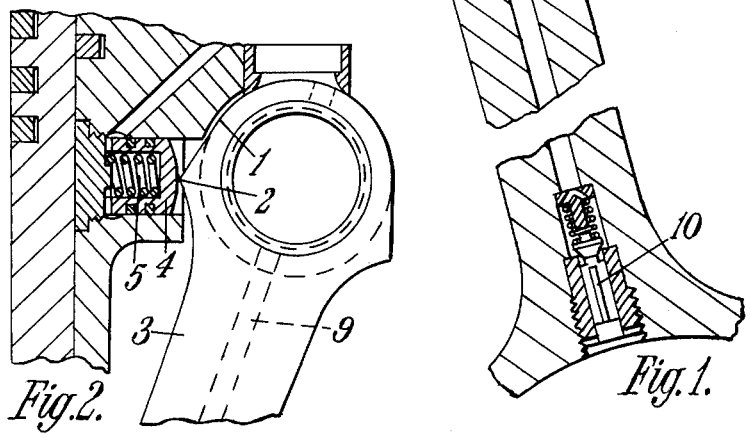
FIGURE 1 is a sectional elevation of a first embodiment.

In FIGURE 1, which shows an arrangement suitable for a trunk-piston engine, a portion 1, 2 of the outer surface of the small end of the connecting rod 3 is shaped to act as a cam which moves the plunger 4 as the connecting rod 3 swings. When the rod has swung to the end of its anti-clockwise travel during the expansion stroke of the piston, contact with the plunger 4 is at 1 as in FIGURE 1. As the expansion stroke is completed and the compression stroke commenced, the rod swings clockwise, and due to the cam action of the portion 1, 2, the plunger 4 is moved to the left as in FIGURE 2 against a return spring 5, thereby pumping lubricating oil past a non-return discharge valve 6 into the hydraulic chamber 7.

During the remainder of the engine cycle, the connecting rod swings anti-clockwise, and the plunger 4 is moved to the right by the return spring 5. The non-return suction valve 8 opens and lubricating oil from the supply passage 9 in the connecting rod, which it enters via the foot-valve 10, flows in to fill the space behind the plunger.

The compression and expansion ratios of the engine are automatically varied mainly in accordance with the maximum gas pressure acting on the piston, thereby to obtain at each condition of operation of the engine the highest permissible compression and expansion ratios. The diameter and stroke of the plunger are chosen to produce a movement, of the order of 1 or 2 hundredths of a millimeter, of the outer portion of the piston relative to the inner portion thereof, in order to decrease the clearance volume. If this action does not cause a maximum cylinder pressure which exceeds the predetermined maximum value thereof, then the small movements continue on each stroke until the said maximum value is temporarily exceeded by a small amount. When this occurs, the discharge valve assembly 11 operates and allows the discharge of a correspondingly small amount of oil. Thus when the engine is operating at constant output the outer part of the piston moves up and down relative to the inner part, by a small amount on each cycle.

The continued movements to increase the compression ratio, occur when the output of the engine is being reduced, and the maximum cylinder pressure would otherwise fall below the predetermined maximum value. There is no need for a rapid increase in compression ratio, as a few cycles at lower maximum cylinder pressure does not do any harm. However, when the output of the engine is increased and the maximum cylinder pressure would rise rapidly and damage the engine, it is necessary to decrease rapidly the compression ratio. Under these circumstances the discharge valve assembly 11 is arranged to open a large area, which allows rapid discharge of oil from the chamber 7, so that the maximum cylinder pressure does not exceed the predetermined value.

When a large cyclic expansion of the hydraulic chamber 7 occurs, e.g. during slow turning of the engine by hand or by a motor, both valves 6 and 8 open, allowing a direct flow of oil from the supply passage 9 into the hydraulic chamber 7, keeping the latter full of oil.

Figure 3:
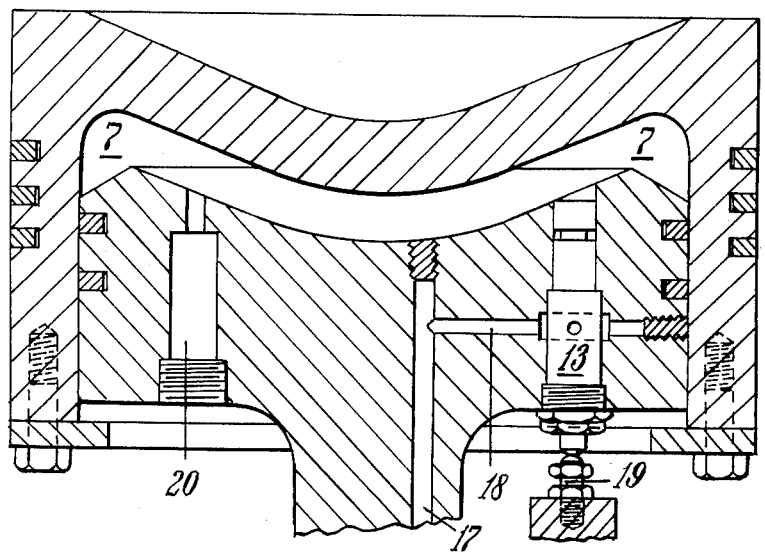
FIGURE 3 is a sectional elevation of a second embodiment.
Figure 4:
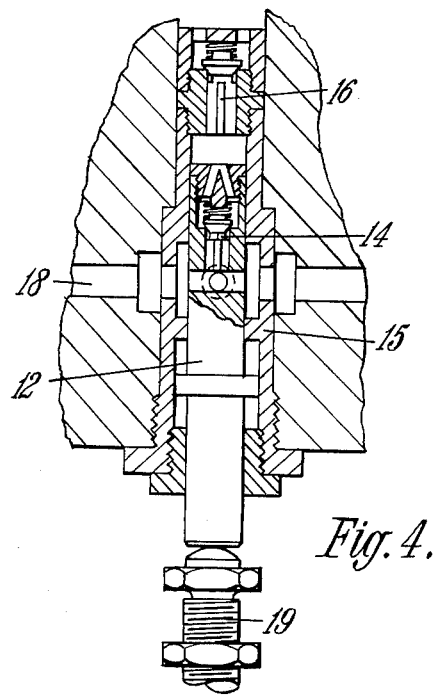
FIGURE 4 is a longitudinal section through the pump of the embodiment shown in FIGURE 3.

FIGURES 3 and 4 show an arrangement suitable for a cross-head engine. The plunger 12 of the pump assembly 13 contains near its upper end a non-return suction valve 14, while the barrel 15 carries at its upper end a non-return discharge valve 16. Lubricating oil is fed to the underside of the suction valve 14 via passages 17 and 18.

When the piston approaches the outer dead centre position, the projecting end of the plunger 12 strikes a stationary stop 19 and during the remaining movement to the dead centre position, the plunger makes its pumping stroke relative to the barrel. A return spring may be fitted if desired but no return spring is shown, because even if the normal lubricating oil supply pressure is offset by the inertia of the column of oil in the connecting rod as the piston accelerates away from the outer dead centre position, the inertia effect will later assist the supply pressure as the piston decelerates on approaching inner dead centre, and the plunger will be forced to its outer position while in a small trunk piston-engine a spring (as shown in FIGURE 1) may be desirable to ensure filling of the pump when the engine is turned slow under cold conditions, cross-head engines are normally large enough to be equipped with means for ensuring an adequate oil supply pressure on starting.

Figure 5:
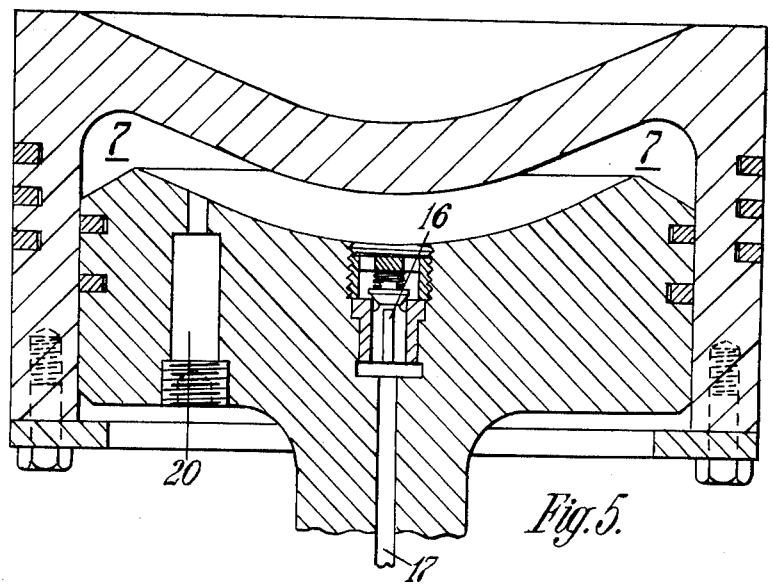
Figure 6:
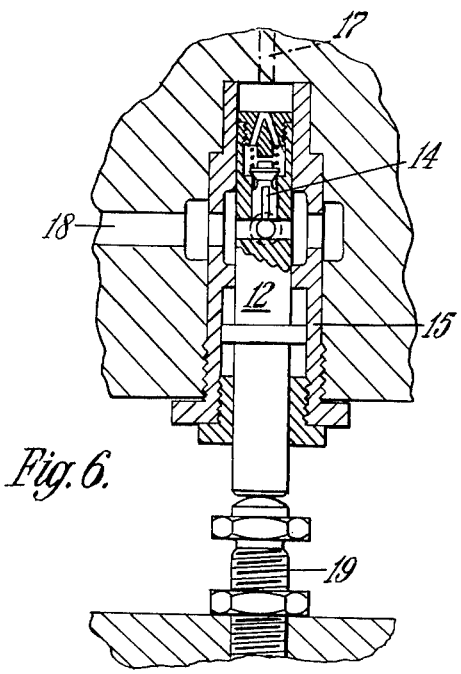

The pump may alternatively be positioned for example in a moving part of the cross-head as shown in FIGURE 6 and can be connected to the piston by way of a passage 17 in the connecting rod 3, see FIGURE 5, the fixed stop 19 being positioned accordingly. The pump then discharges into the lower end of passage 17 leading into the hydraulic chamber by way of the non-return valve 16. The parts shown in FIGURES 5 and 6 act in the same manner as the similarly indicated parts in FIGURES 3 and 4.

Figure 7:
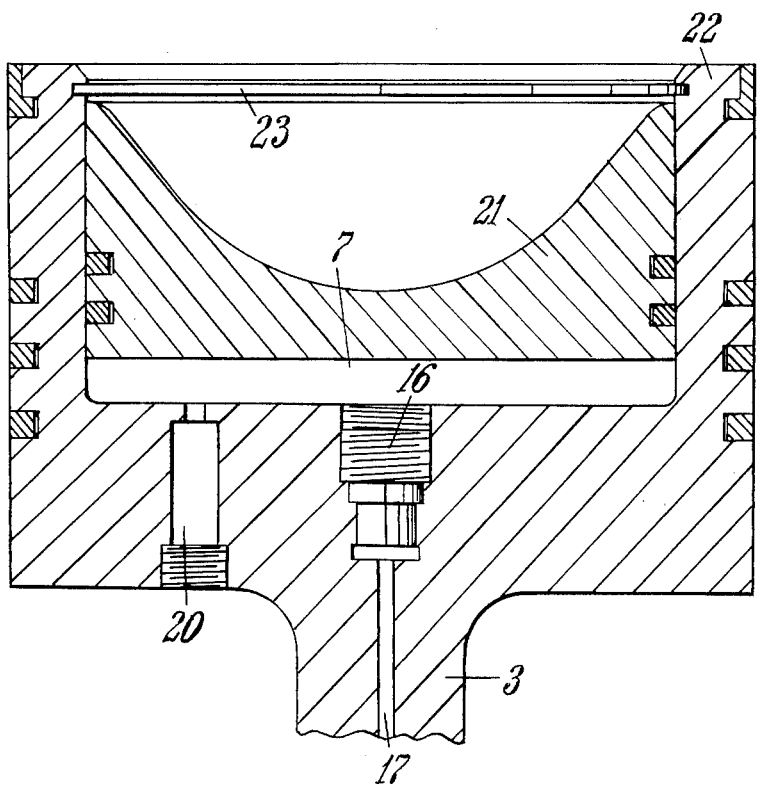
FIGURE 7 is a section of a piston of which the crown is in two parts.

In the construction shown in FIGURE 7, which is alternative to the arrangement shown in FIGURE 5, is for use with the pump of FIGURE 6. The crown of the piston is made in two parts, an inner piston like part 21 slidable longitudinally in the cylindrical recess in the outer cup-like part 42. The ring 23 is provided in a groove in the wall of the outer part 22 to restrict the longitudinal movement of the inner part.

The expansible and contractible chamber 7 is formed between the two parts. The piston works in a similar manner to that described in relation to FIGURES 5 and 6.

By suitable adaptation the piston of FIGURES 1 and 3 can be made with the crown in two parts similar to the arrangement shown in FIGURE 7.

It is to be understood that the above description is by way of example only, and that details for carrying the invention into effect may be varied without departing from the scope of the invention claimed.

I claim:

1. In a two-stroke cycle internal combustion engine the improvement comprising the provision of a piston comprising a first main part and a second main part axially moveable with respect to said first main part, said first main part forming at least part of the crown of the piston, means for connecting said second main part to the engine output shaft and an expansible and contractible chamber between said main parts, a first passage in said second main part for conducting fluid from a passage in the said connecting means to said chamber, a second passage in said second main part for conducting fluid from said chamber to the exterior of said piston at the end opposite to the crown, a spring loaded pressure relief valve in said second passage to control flow of fluid from said chamber, and a pump connected on its inlet side through a non-return suction valve to said first passage and on its outlet side through a non-return discharge valve to said chamber, and means responsive to movement of said piston actuating said pump as said piston approaches outer dead-center position.

2. In a two-stroke cycle internal combustion engine the improvement comprising the provision of a piston comprising a first main part and a second main part axially moveable with respect to said first main part, said first main part forming at least part of the crown of the piston, means for connecting said second main part to the engine output shaft and an expansible and contractible chamber between said main parts, a first passage in said second main part for conducting fluid from a passage in the said connecting means to said chamber, a second passage in said second main part for conducting fluid from said chamber to the exterior of said piston at the end opposite to the crown, a spring loaded pressure relief valve in said second passage to control flow of fluid from said chamber, and a plunger type pump within the piston and connected on its inlet side through a non-return suction valve to said first passage and on its outlet side through a non-return discharge valve to said chamber, a cam member upon one end of the connecting rod, the pump being mounted in such position that the cam member bears upon the plunger of the pump and actuates the pump as the connecting rod swings from one side of the piston to the other as the expansion stroke is completed and the compression stroke commences.

3. In a two-stroke cycle internal combustion engine the improvement comprising the provision of a piston comprising a first main part and a second main part axially movable with respect to said first main part, said first main part forming at least part of the crown of the piston, means for connecting said second main part to the engine output shaft and an expansible and contractible chamber between said main parts, a first passage in said second main part for conducting fluid from a passage in the said connecting means to said chamber, a second passage in said second main part for conducting fluid from said chamber to the exterior of said piston at the end opposite to the crown, a spring loaded pressure relief valve in said second passage to control flow of fluid from said chamber, and a plunger type pump within the piston connected on its inlet side through a non-return suction valve to said first passage and on its outlet side through a non-return discharge valve to said chamber, and a stationary stop upon a fixed part of the engine which engages and actuates the plunger of the pump as the piston approaches the outer dead centre.

4. In a two-stroke cycle internal combustion engine of the cross-head kind the improvement comprising the provision of a piston comprising a first main part and a second main part axially movable with respect to said first main part, said first main part forming at least part of the crown of the piston, means for connecting said second main part to the engine output shaft and an expansible and contractible chamber between said main parts, a first passage in said second main part for conducting fluid from a passage in the said connecting means to said chamber, a second passage in said second main part for conducting fluid from said chamber to the exterior of said piston at the end opposite to the crown, a spring loaded pressure relief valve in said second passage to control flow of fluid from said chamber, and a plunger type pump mounted in the cross-head, the pump being connected on its inlet side through a non-return suction valve to said first passage and on its outlet side through a non-return discharge valve to said chamber, and a stationary stop upon a fixed part of the engine which engages and actuates the plunger of the pump as the piston approaches the outer dead centre.

5. In a two-stroke cycle internal combustion engine the improvement comprising the provision of a piston comprising a first main part and a second main part axially movable in respect to the first main part, said first main part comprising a supplementary piston slideably received in an axially positioned recess in the second main part and open at the crown end of the piston, with the space between said supplementary piston and the closed end of said recess providing the chamber, means for connecting said second main part to the engine output shaft, a first passage in said second main part for conducting fluid from a passage in the connecting rod to said chamber, a second passage in said second main part for conducting fluid from said chamber to the exterior of said piston at the end opposite to the crown, a spring loaded pressure relief valve in said second passage to control flow of fluid from said chamber, and a pump connected on its inlet side through a non-return suction valve to said first passage and on its outlet side through a non-return discharge valve to said chamber, and means responsive to movement of said piston actuating said pump as said piston approaches outer dead center piston.

References Cited by the Examiner

UNITED STATES PATENTS

| | | | |
|---|---|---|---|
| 1,926,598 | 9/33 | Peterson | 123—78 |
| 2,066,498 | 1/37 | Shannon | 92—82 X |
| 3,014,468 | 12/61 | Mansfield | 123—48 |

MARK NEWMAN, *Primary Examiner.*

FRED E. ENGELTHALER, *Examiner.*